US011890572B1

United States Patent
Scott et al.

(10) Patent No.: US 11,890,572 B1
(45) Date of Patent: Feb. 6, 2024

(54) SODA MAGCITE COMPOSITION, METHODS OF MANUFACTURE AND USE IN CARBON DIOXIDE ($CO_2$) SEQUESTRATION

(71) Applicant: ASPIRING MATERIALS LIMITED, Christchurch (NZ)

(72) Inventors: Allan Charles Nye Scott, Christchurch (NZ); Christopher John-Paul Oze, Christchurch (NZ)

(73) Assignee: ASPIRING MATERIALS LIMITED, Christchurch (NZ)

( * ) Notice: Subject to any disclaimer, the term of this patent is extended or adjusted under 35 U.S.C. 154(b) by 0 days.

(21) Appl. No.: 17/945,358

(22) Filed: Sep. 15, 2022

(51) Int. Cl.
B01D 53/62 (2006.01)

(52) U.S. Cl.
CPC ........ B01D 53/62 (2013.01); *B01D 2253/106* (2013.01); *B01D 2253/1122* (2013.01); *B01D 2257/504* (2013.01)

(58) Field of Classification Search
CPC ........................ B01D 53/62; B01D 2257/504
USPC ....................................................... 423/323
See application file for complete search history.

(56) References Cited

U.S. PATENT DOCUMENTS

| | | |
|---|---|---|
| 2,423,688 A | 7/1947 | Day et al. |
| 2,470,214 A | 5/1949 | Egan et al. |
| 4,800,003 A | 1/1989 | Peacey et al. |
| 5,091,161 A | 2/1992 | Harris et al. |
| 5,780,005 A | 7/1998 | Olerud |
| 7,329,396 B2 | 2/2008 | Harris et al. |
| 2013/0056916 A1 | 3/2013 | Blencoe et al. |
| 2013/0280152 A1* | 10/2013 | Singh ............... B01D 53/62 423/232 |
| 2022/0267159 A1* | 8/2022 | Shi ................. C01B 33/128 |

FOREIGN PATENT DOCUMENTS

| | | |
|---|---|---|
| CA | 2583068 | 1/2006 |
| EP | 1768928 | 12/2011 |
| NZ | 137230 | 9/1966 |
| WO | 02/48036 | 6/2002 |
| WO | 2006/001700 | 1/2006 |
| WO | 2014/029031 | 2/2014 |
| WO | 2017/222396 | 12/2017 |
| WO | WO-2022113025 A2 * | 6/2022 |

OTHER PUBLICATIONS

Raza et al., "Synthesis and characterization of amorphous precipitated silica from alkaline dissolution of olivine", RSC Adv., 2018, 8, 32651-32658. (Year: 2018).*

(Continued)

*Primary Examiner* — Anita Nassiri-Motlagh
(74) *Attorney, Agent, or Firm* — ARC IP Law, PC; Joseph J. Mayo

(57) ABSTRACT

Described herein is a soda magcite composition, methods of manufacture of soda magcite compositions and use of soda magcite for carbon dioxide sequestration. The soda magcite composition comprises a mixture of magnesium hydroxide, metal hydroxide and water to create a composition that is highly effective at sequestering carbon dioxide.

18 Claims, 4 Drawing Sheets

(56) References Cited

OTHER PUBLICATIONS

Joffrey Bourdareau, "Watch & Learn: Magnesium hydroxide vs caustic soda demo", IER, Aug. 30, 2020. (Year: 2020).*
Prigiobbe, et al., "Mineral carbonation process for $CO_2$ sequestration. Energy Procedia" 1, 4885-4890; 2009 (12 pages).
Neubeck, et al., "Olivine alteration and $H_2$ production in carbonate-rich, low temperature aqueous environments"; Planetary and Space Science , 96, 51-61; 2014 (22 pages).
Scott, et al., "Constructing Mars: Concrete and energy production from serpentinization Products"; Earth and Space Science, 5 (8), 364-370; 2018 (7 pages).
Kelemen, et al., "An overview of the status and challenges of $CO_2$ storage in minerals and geological formations;" Frontiers in Climate, 1, 9; 2019 (20 pages).
Scott, et al., "Magnesium-based cements for Martian construction"; Journal of Aerospace Engineering , 33 (4), 04020019; 2020 (2 pages).
Scott, et al., "Transformation of abundant magnesium silicate minerals for enhanced $CO_2$ sequestration"; Communications Earth & Environment , 2(1), 1-6; 2021 (6 pages).
Nye, et al., "Use of olivine for the production of $MgO-SiO_2$ binders", Frontiers in Built Environment, 640243: May 2021 (8 pages).
Shah, et al., "Use of kaolinite clays in development of a low carbon MgO-clay binder system"; Cement and Concrete Research, 144, 106422; Jun. 2021 (3 pages).
Dhakal, et al., "Development of a MgO-metakaolin binder system" Construction and Building Materials , 284, 122736; May 17, 2021 (3 pages).

* cited by examiner

SODA MAGCITE COMPOSITION, METHODS OF MANUFACTURE AND USE IN CARBON DIOXIDE ($CO_2$) SEQUESTRATION

BACKGROUND OF THE INVENTION

Field of the Invention

Described herein is a soda magcite composition, methods of manufacture of soda magcite compositions and use of soda magcite for carbon dioxide ($CO_2$) sequestration.

Description of the Related Art

Carbon dioxide ($CO_2$) emissions are a key driver of climate change and ways to minimise or avoid such emissions are of heightened interest. One method of reducing $CO_2$ emissions is to sequester or capture the $CO_2$ before it enters the atmosphere.

Soda lime is a compound that has been used to sequester $CO_2$ from industrial systems as well as to maintain breathable air in enclosed spaces.

Soda lime is effective at removing $CO_2$ at low and high concentrations.

Soda lime is not practical for large scale carbon sequestration as a means of reducing global $CO_2$ levels. Existing sequestrants such as soda lime are capable of sequestering $CO_2$, however, the method of soda lime production from calcium carbonates releases $CO_2$. Hence, there is no benefit for using soda lime as a net zero to negative $CO_2$ sequestrant. The reason for the above loss of $CO_2$ during manufacture is that the source of material for soda lime is typically a carbonate mineral which evolves $CO_2$ during production. There is also a considerable energy requirement to convert the carbonate into soda lime which may also contribute to the release of $CO_2$ via combustion of fossil fuels.

Ideally, a $CO_2$ sequestrant should be sourced from a non-carbonate material and/or have a manufacturing process that does not release $CO_2$, resulting in a net sequestration of $CO_2$.

Further aspects and advantages of the soda magcite composition, methods of manufacture and methods of $CO_2$ sequestration will become apparent from the ensuing description that is given by way of example only.

BRIEF SUMMARY OF THE INVENTION

A soda magcite composition, methods of manufacture of soda magcite compositions and use of soda magcite for carbon dioxide sequestration are described herein. The soda magcite composition may comprise a mixture of magnesium hydroxide, metal hydroxide and water to create a soda magcite composition that may be highly effective at sequestering carbon dioxide. Further, soda magcite may be manufactured in a variety of ways that do not release $CO_2$ during manufacture.

In a first aspect, there is provided a soda magcite composition comprising:
 magnesium hydroxide;
 metal hydroxide; and
 water.

In a second aspect, there is provided a method of manufacturing a soda magcite composition comprising:
 selecting a magnesium hydroxide containing material;
 selecting a metal hydroxide; and
 mixing water with the magnesium hydroxide containing material and the metal hydroxide to form the soda magcite composition.

In a third aspect there is provided a method of manufacturing a soda magcite composition comprising:
 selecting a magnesium containing silicate source;
 subjecting the selected magnesium containing silicate source to acid wash, to produce an acid digested solution;
 subjecting the acid digested solution to a base wash by adding a base solution to the acid digested solution to produce a magnesium salt solution and, during this step, removing silica, iron or other metals and minerals from the magnesium salt solution;
 subjecting the magnesium salt solution to electrolysis to recover magnesium hydroxide;
 mixing the recovered magnesium hydroxide with a solution containing metal hydroxide and water to produce the soda magcite composition.

In a fourth aspect there is provided a method of manufacturing a soda magcite composition comprising:
 selecting a magnesium containing silicate source;
 subjecting the selected magnesium containing silicate to an acid wash, to produce an acid digested solution;
 subjecting the acid digested solution to a first base wash by adding a base solution to the acid digested solution to produce a magnesium salt solution and, during this step, removing silica, iron or other metals and minerals from the magnesium salt solution;
 completing a further base wash to separate magnesium hydroxide in solution;
 filtering the separate magnesium hydroxide in solution and recovering a magnesium hydroxide retentate and a permeate, the permeate substantially comprising metal salt in solution;
 mixing the recovered magnesium hydroxide retentate with a solution comprising metal hydroxide and water to produce the soda magcite composition.

In a fifth aspect there is provided a method of manufacturing a soda magcite composition comprising:
 selecting a magnesium containing silicate source;
 subjecting the selected magnesium containing silicate source to a base wash by adding a base solution to the magnesium containing silicate source to produce a magnesium hydroxide solution;
 mixing the recovered magnesium hydroxide with a solution containing metal hydroxide and water to produce the soda magcite composition.

In a sixth aspect, there is provided a method of sequestration of carbon dioxide $CO_2$ by:
 selecting a soda magcite composition, the soda magcite composition comprising magnesium hydroxide, metal hydroxide, and water;
 exposing the soda magcite composition to $CO_2$; and
 wherein the soda magcite composition reacts with the $CO_2$ to form stable magnesium carbonates and hydrated magnesium carbonates and hence sequesters the $CO_2$.

The inventors have identified a soda magcite composition acts in a synergistic manner to sequester $CO_2$. Magnesium hydroxide materials do sequester $CO_2$. The inventors found that by mixing metal hydroxide and water with magnesium hydroxide, the rate of $CO_2$ sequestration by the magnesium hydroxide may rapidly accelerate, to the point of being a rapid and useful method of reducing $CO_2$ emissions. Sequestration may be by direct air capture or from a point source.

A further advantage identified is that the soda magcite composition may be made without the method itself producing $CO_2$, and hence negating any benefits of subsequent sequestration.

BRIEF DESCRIPTION OF THE DRAWINGS

Further aspects of the soda magcite composition, methods of manufacture and methods of $CO_2$ sequestration will become apparent from the following description that is given by way of example only and with reference to the accompanying drawings in which.

DETAILED DESCRIPTION OF THE INVENTION

Figure 1:
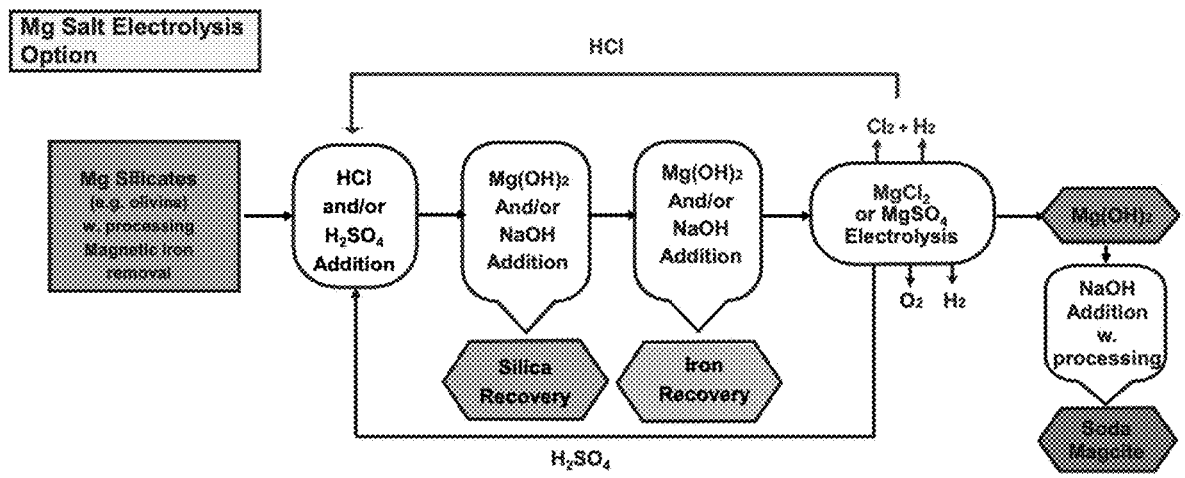
FIG. 1 illustrates a flow diagram of a method of producing magnesium hydroxide along with subsequent manufacture of a soda magcite composition.

As noted above, a soda magcite composition, methods of manufacture of soda magcite compositions and use of soda magcite for carbon dioxide sequestration are described. The composition may comprise a mixture of magnesium hydroxide, metal hydroxide and water to create a composition that may be highly effective at sequestering carbon dioxide.

For the purposes of this specification, the term 'about' or 'approximately' and grammatical variations thereof mean a quantity, level, degree, value, number, frequency, percentage, dimension, size, amount, weight or length that varies by as much as 30, 25, 20, 15, 10, 9, 8, 7, 6, 5, 4, 3, 2, or 1% to a reference quantity, level, degree, value, number, frequency, percentage, dimension, size, amount, weight or length.

The term 'substantially' or grammatical variations thereof refers to at least about 50%, for example 75%, 85%, 95% or 98%.

The term 'comprise' and grammatical variations thereof shall have an inclusive meaning—i.e. that it will be taken to mean an inclusion of not only the listed components it directly references, but also other non-specified components or elements.

Reference is made hereafter to 'soda magcite' or grammatical variations thereof. This may also be called 'sodium magnesium hydrate'. This compound may also be described as being a magnesium-based hydrate.

The term 'alkali metals' and grammatical variations thereof as used herein refers to both alkali and alkaline metals.

The term 'hydrate' and grammatical variations thereof as used herein refers to a compound, composition or substance that has variable amounts of water present.

Soda Magcite Composition

In a first aspect, there is provided a soda magcite composition comprising:
magnesium hydroxide;
metal hydroxide; and
water.

The inventors have identified that the above composition acts in a synergistic manner to sequester $CO_2$. Magnesium hydroxide materials do sequester $CO_2$. The inventors found that by mixing metal hydroxide and water with magnesium hydroxide, the rate of $CO_2$ sequestration by the magnesium hydroxide may rapidly accelerate, to the point of being a rapid and useful method of reducing $CO_2$ emissions. Sequestration may be by direct air capture or from a point source.

Magnesium Hydroxide

The magnesium hydroxide may be present as $Mg(OH)_2$. The magnesium hydroxide may be present as a hydrate of magnesium hydroxide.

The magnesium hydroxide may be obtained from magnesium silicate bearing minerals comprising: olivine, serpentine group minerals, pyroxenes, amphiboles, and combinations thereof.

The magnesium hydroxide may be obtained from minerals such as olivine. Olivine is a magnesium-rich silicate present in widely distributed mafic and ultramafic rock deposits. For these reasons, olivine may be an ideal source material to manufacture magnesium hydroxide used to form the soda magcite.

The magnesium silicate bearing minerals may be sourced as: sands, sediment, rock, and combinations thereof. These material sources are common natural forms for magnesium silicate bearing materials.

The soda magcite composition may comprise approximately 1-99%, or 5-95%, or 20-90%, or 60-90%, or approximately 70-80% by weight magnesium hydroxide. These ranges may provide an improvement in operating efficiencies which may be based on the relative proportion of magnesium hydroxide, metal hydroxide and water.

Metal Hydroxide

The metal hydroxide may be a metal alkali.

The metal hydroxide described above is not magnesium hydroxide.

The metal hydroxide may be selected from: sodium hydroxide (NaOH), lithium hydroxide (LiOH), potassium hydroxide (KOH), calcium hydroxide ($Ca(OH)_2$), and combinations thereof.

As noted above, the presence of metal hydroxide appears to catalyse the reaction between magnesium hydroxide and $CO_2$, causing far higher $CO_2$ sequestration than for magnesium hydroxide alone. The listed metal hydroxides are abundant and relatively inexpensive hence why they may be useful to use. Other metal hydroxides may be used and this list should not be seen as limiting.

The soda magcite composition may comprise approximately 0.1-99%, or 1-95%, or 0.1-20%, or 1-10%, or approximately 5% by weight metal hydroxide. These ranges may provide an improvement in operating efficiencies which may be based on the relative proportion of magnesium hydroxide, metal hydroxide and water. Process efficiencies are capable of being modified to suit the requirements of chemical reactivity needed for end use applications (i.e. $CO_2$ reactivity and sequestration).

Water

Water may be used to allow for reaction of magnesium hydroxide and metal hydroxides present, with $CO_2$ for carbon sequestration purposes. For example, the metal hydroxide may act as a catalyst to accelerate, or shift, or accelerate and shift, the reaction equilibrium of magnesium hydroxide with carbon dioxide to favour carbonation of the magnesium hydroxide $Mg(OH)_2$. Water may be needed to help this reaction by allowing intimate mixing of the compounds used.

The soda magcite composition may comprise at least approximately 1-99%, or 5-99%, or 5-95%, or 5-60%, or 5-35%, or approximately 20% by weight water. In one example, greater than approximately 5% by weight of the soda magcite composition is water. Moisture may be required to facilitate the uptake of $CO_2$ by soda magcite. Moisture content may be varied to change the workability and reactivity needed for end-user applications and products.

The amount of water present in the soda magcite composition may depend on the final form of the soda magcite composition.

Pellet or Granule Form

The soda magcite composition may be configured as a pellet or granule. Pellets or granules may be useful for ease of handling.

The pellet or granule may approximately comprise (% by weight):
  magnesium hydroxide from 1-99%, or 5-95%, or from 20-90%, or from 60-90%, or 70-80%, or approximately 75%;
  metal hydroxide from 0.1-99%, or from 1-95%, or from 0.1-20%, or from 1-10%, or approximately 5%; and
  water from 1-99%, or from 5-95%, or from 5-60%, or from 5-35%, or approximately 20%.

Relative percentages within the ranges described above may be used as described in other parts of this specification.

The pellets or granules produced may be approximately 1 μm to 10 mm, or 0.5 to 2 mm, or approximately 1 mm in diameter. Note that the term 'diameter' is used for brevity. The pellets or granules do not need to be round or spherical as alluded to by referring to diameter and the pellets or granules may take a variety of shapes all of a size within the ranges described.

Slurry Form

The soda magcite composition may be configured as a slurry. Slurry configuration may be useful to reduce or prevent dust and inhalation handling issues. The solid content of the slurry may be variable. In one example, the solid content may be from 1-50%, or 1-40%, or 1-30%, or 1-20%, or 5-15%, or approximately 10% by weight. Liquid contents at these rates may be useful to allow the slurry to be mobilised for transfer.

The slurry may approximately comprise (% by weight):
  magnesium hydroxide from 1-99%;
  metal hydroxide from 0.1-99%; and
  water from 5-99%.

Relative percentages within the ranges described above may be used as described in other parts of this specification.

Silica Containing Materials

The soda magcite composition may further comprise silica containing materials. In one example, the silica containing materials if used, may be added as a powder. The silica containing materials may comprise less than approximately 50%, or 40%, or 30%, or 20%, or 10% by weight of the soda magcite composition.

The silica containing materials may be clays, quartz or other siliceous minerals.

The silica containing materials may be kaolin, smectite, bentonite or vermiculite.

The silica containing materials are understood by the inventors to increase the rate at which the soda magcite composition described above may sequester $CO_2$. Without being bound by theory, the mechanism for why silica containing materials increase sequestration rate may be because these materials give the soda magcite composition a higher void space, higher pore reaction area, and higher surface area for contact and reaction between the magnesium hydroxide and $CO_2$.

Inert Materials

The soda magcite composition may further comprise inert materials. The inert materials may comprise: carbonates, silicates, oxides, and sulphates and combinations thereof. The inert materials may be selected from: clay minerals, quartz, zeolites, calcite, magnetite, magnesite and combinations thereof.

The inert materials used may be selected based on the ability of the inert material to increase the overall porosity of the soda magcite composition and improve the carbon sequestration rates of the soda magcite composition. The inert materials used may also be selected based on the ability of these materials to meet certain physical characteristics for the end product.

The soda magcite composition may comprise 5%, or 10%, or 15%, or 20% by weight inert materials. The soda magcite composition may approximately comprise 5-20%, or 10-20%, or 5-15%, or 15-20% by weight inert materials. The amount of inert materials present may be varied to allow for changes in porosity to meet the requirements of the end application for the soda magcite composition. The inventors have found that 5-20% by weight of inert materials may be suitable for many $CO_2$ sequestration applications.

Metal Salts

The soda magcite composition may further comprise metal salts. Metal salts may be present in the soda magcite composition as residue from magnesium hydroxide manufacturing. By way of example, various metal salts may be used to produce the magnesium hydroxide and at least some of these metal salts may remain in the magnesium hydroxide material used to form the soda magcite composition.

The metal salts present in the soda magcite composition may be selected from: lithium chloride (LiCl), sodium chloride (NaCl), potassium chloride (KCl), magnesium chloride ($MgCl_2$), sodium sulphate ($Na_2SO_4$), magnesium sulphate ($MgSO_4$), calcium sulphate ($CaSO_4$), lithium sulphate ($Li_2SO_4$), calcium chloride ($CaCl_2$)), and combinations thereof.

Metal salts, if present, may comprise less than approximately 20%, or 19%, or 18%, or 17%, or 16%, or 15%, or 14%, or 13%, or 12%, or 11%, or 10%, or 9%, or 8%, or 7%, or 6%, or 5%, or 4%, or 3%, or 2%, or 1% by weight of the soda magcite composition.

In the inventor's experience, metal salt concentrations above 20% by weight may impair the effectiveness/ability of soda magcite to react with $CO_2$.

In the inventors' experience, metal salts if present at low concentrations have minimal if any impact on the soda magcite composition activity in regards to $CO_2$ sequestration.

Magnesium Oxide

The soda magcite composition may further comprise magnesium oxide (MgO). The magnesium oxide may also be present as a residue from magnesium hydroxide manufacturing. In the inventors experience, MgO if present has minimal if any impact on the soda magcite composition activity in regards to $CO_2$ sequestration.

$CO_2$ During Manufacture

The soda magcite composition may have low to zero carbon emissions during production as it is made from silicate minerals that have no inherent $CO_2$, such as carbonate groups seen in the materials used to form other sequestration materials like soda lime.

The soda magcite composition may also react with carbon dioxide to capture and sequester carbon dioxide which is discussed further below.

Comparison to Soda Lime

The soda magcite composition may have similar properties to soda lime and may be used interchangeably with soda lime. 'Similar properties' in the context of this specification refers to the ability of the soda magcite composition to sequester or reduce $CO_2$ preferentially and quickly, even at low concentrations. Soda lime, however, has the drawback that carbon dioxide is released from the soda lime manufacturing process.

This means that later sequestration only results in a net neutral $CO_2$ effect (i.e. the amount of $CO_2$ sequestered is similar to the amount produced to manufacture soda lime). By contrast, $CO_2$ is not released during soda magcite production and, hence, there may be a net benefit from the soda magcite composition to reduce $CO_2$ emissions to the atmosphere.

Method of Manufacture—Magnesium Hydroxide—any Source

In a second aspect, there is provided a method of manufacturing a soda magcite composition comprising:
  selecting a magnesium hydroxide containing material;
  selecting a metal hydroxide; and
  mixing water with the magnesium hydroxide containing material and the metal hydroxide to form the soda magcite composition.

Magnesium Hydroxide Containing Material

The magnesium hydroxide containing material may be produced via a processing method prior to completing this method or may be supplied prior to commencement of the above method.

As noted above, the magnesium hydroxide containing material may be present as $Mg(OH)_2$, or as a hydrate of magnesium hydroxide.

Other aspects about the magnesium hydroxide, metal hydroxide and water may be as described above and are not repeated here for brevity.

Initial Grinding

Optionally, and if applicable, the magnesium hydroxide may be ground prior to the above method to produce an average particle size less than 1 mm. Particle sizes less than 1 mm may be useful as the surface area is higher and hence the reaction rate for $CO_2$ sequestration and manufacturing techniques to produce magnesium hydroxide will progress faster than lower surface area mixtures.

Water Removal

Some water removal may occur from the soda magcite composition once produced.

Water removal may be via drying. Drying may be via methods including: filtration, conventional drying, and vacuum evaporation drying. Drying may be to reduce the water content.

Water removal noted above may result in greater than approximately 5%, or 10%, or 20%, or 30%, or 40%, or 50%, 60%, or 70%, or 80%, or 90% by weight of water being removed from the soda magcite composition described above. As noted elsewhere, sufficient water removal may occur to produce a soda magcite composition with a water content of at least approximately 1-99%, or 5-99%, or 5-95%, or 5-60%, or 5-35%, or approximately 20% by weight water. Water removal to the extent described may be useful in order to decrease energy requirements for drying the materials where water is beneficial for reactivity, transport, and minimising dust/inhalation issues.

Pellet/Granule or Slurry

The soda magcite composition produced above may be formed into a pellet or granule, or alternatively, into a slurry. The pellet, granule or slurry may have the characteristics noted earlier in this specification.

Other Materials

The soda magcite composition produced may have further materials added comprising the silica containing materials, inert materials, and metal salts, described above.

Method of Manufacture—Acid/Base Wash and Magnesium Salt Electrolysis

In a third aspect there is provided a method of manufacturing a soda magcite composition comprising:
  selecting a magnesium containing silicate source;
  subjecting the selected magnesium containing silicate source to acid wash, to produce an acid digested solution;
  subjecting the acid digested solution to a base wash by adding a base solution to the acid digested solution to produce a magnesium salt solution and, during this step, removing silica, iron or other metals and minerals from the magnesium salt solution;
  subjecting the magnesium salt solution to electrolysis to recover magnesium hydroxide;
  mixing the recovered magnesium hydroxide with a solution containing metal hydroxide and water to produce the soda magcite composition.

Magnesium Containing Silicate Source

As noted elsewhere in this specification, the magnesium containing silicate may be obtained from magnesium silicate bearing minerals comprising: olivine, serpentine group minerals, pyroxenes, and amphiboles. The magnesium silicate bearing minerals may be sourced as: sands, sediment, rock, and combinations thereof.

Crushing and Grinding

The magnesium containing silicate may be crushed prior to processing above. Crushing may be to sand size or less than approximately 1 mm average diameter.

A portion of iron (if present) in the magnesium containing silicate may be removed from the raw magnesium containing silicate. Removal may be through magnetic separation. The magnetic iron may be recovered as a by-product.

Remaining magnesium containing silicate may be further ground. Grinding may be to a particle size of less than 100 μm. The ground magnesium containing silicate may be a finely ground magnesium containing silicate prior to processing in the above method.

Iron removal (if needed) may also be completed using the finely ground magnesium containing silicate described.

Two grinding steps may be completed. The number of grinding steps completed may vary depending on the size and type of source material used. Two grinding steps may allow for easier removal of iron followed by a finer grinding to increase reactivity and dissolution rate of the magnesium containing silicate in the above method.

Note that the terms 'crushing' and 'grinding' are used herein, however, this should not be seen as limiting as the process relates to reducing particle size and increasing surface area which may be achieved by various methods not limited to use of a crusher or grinder.

Acid Wash

Acid washing may be completed for example using an acid selected from hydrochloric acid (HCl) or sulphuric acid ($H_2SO_4$). These acids may be useful because they are easy to obtain and low cost. Other acids may be used and reference to HCl or $H_2SO_4$ should not be seen as limiting.

Acid washing may occur at an elevated temperature. The elevated temperature may be from approximately 40-95° C., or 50-90° C., or 60-85° C., or approximately 80° C. As the temperature increases, the acid effectiveness at washing also increases up to an optimum that in the inventor's experience is at around 80° C., although other temperatures may be used.

Acid washing may occur over a period of time. Acid washing may take place over approximately 1-24, or 1-12, or 1-6, or 1-5, or 1-4, or 1-3, or approximately 2 hours. Acid washing times may vary due to variable mineralogy of the magnesium containing silicate source material.

In the inventor's experience, the pH at the beginning of acid washing may be below pH 2 or even negative pH. Over time, and as the magnesium containing silicate is digested by the acid conditions, the pH may tend to rise. In one example, if olivine is acid washed in 2 M HCl at 80° C. for 2 hours then, after 2 hours, the pH becomes positive (to approximately 0.5 from less than zero).

There may be a further ripening step after the above acid wash where the pH is increased to pH 1 or greater, and left for another 1-24 hours. Ripening in this case may allow the silica to develop further prior to separation.

Base Wash

The base solution may be selected from: lithium hydroxide (LiOH), sodium hydroxide (NaOH), potassium hydroxide (KOH), magnesium hydroxide ($Mg(OH)_2$), calcium hydroxide ($Ca(OH)_2$). Other metal hydroxides may also be used in the inventor's experience. Sodium hydroxide (NaOH) was typically used by the inventors as this is easily available and lowest cost.

Base washing may occur at an elevated temperature. An 'elevated temperature' may be a temperature above ambient conditions of approximately 15-25° C. The elevated temperature may be from approximately 40-95° C., or 40-80° C., or approximately 50-70° C. Base washing temperatures may vary due to variable mineralogy of the magnesium containing silicate source material. At elevated temperatures, many of the magnesium-bearing silicate minerals will sufficiently react or react to an optimum extent.

Base washing may occur over a period of time. Base washing may take place over approximately 10 min-12 hours, or 10 min-3 hours, or 10-120 min, or 10-90 min, or, or less than 90 min. Base washing times may vary due to variable mineralogy of the magnesium containing silicate source material.

Base washing may occur in two steps. A first step may involve base washing for a first period of time (less than approximately 60 min) at which point the pH is increased to approximately 2 or greater. A second step may involve addition of further base solution and base washing for another time period at which point the pH may be increased to approximately 4 or greater to precipitate and remove silica and any precipitated iron. Two (or more) steps of base washing may be useful to allow for separation of side products from the reaction which may be collected as separate product streams. The time period for this second step may be less than approximately 24 hours, or less than 60, or 50, or 40, or 30, or 20, or 10 min.

Electrolysis

As may be appreciated, electrolysis apparatus operating characteristics may vary depending on the device operating details. In one example, the inventors found that electrolysis apparatus used provided good separation at approximately 40-90° C., an electrical current density of at least approximately 0.1 kA/$m^2$ and with an anode being a mixed metal oxide titanium and the cathode being stainless steel or nickel.

Other materials could be used for the anode and cathode and reference to these materials are provided by way of illustration only. Similarly, other temperatures and electrical current densities could be used as well.

Water Removal

At least some water removal may occur from the recovered magnesium hydroxide in the above method. Water removal may occur prior to soda magcite composition manufacture. Water removal may be via drying. Drying may be via methods including: air drying, filtration, conventional drying, vacuum evaporation drying, and combinations thereof.

Drying may be used to reduce the water content in this aspect as well. Water removal noted above may result in greater than approximately 5%, or 10%, or 20%, or 30%, or 40%, or 50%, or 60%, or 70%, or 80%, or 90% by weight of water being removed from the soda magcite composition described above. As noted elsewhere, sufficient water removal may occur to produce a soda magcite composition with a water content of at least approximately 1-99%, or 5-99%, or 5-95%, or 5-60%, or 5-35%, or approximately 20% by weight water.

Method of Manufacture—Mineral Precipitation Using Metal Hydroxide Addition, Metal Salt Electrolysis Option In a fourth aspect there is provided a method of manufacturing a soda magcite composition comprising:
   selecting a magnesium containing silicate source;
   subjecting the selected magnesium containing silicate to an acid wash, to produce an acid digested solution;
   subjecting the acid digested solution to a first base wash by adding a base solution to the acid digested solution to produce a magnesium salt solution and, during this step, removing silica, iron or other metals and minerals from the magnesium salt solution;
   completing a further base wash to separate magnesium hydroxide in solution;
   filtering the separate magnesium hydroxide in solution and recovering a magnesium hydroxide retentate and a permeate, the permeate substantially comprising metal salt in solution;
   mixing the recovered magnesium hydroxide retentate with a solution comprising metal hydroxide and water to produce the soda magcite composition.

Magnesium Containing Silicate Source

As noted elsewhere in this specification, the magnesium containing silicate may be obtained from magnesium silicate bearing minerals comprising: olivine, serpentine group minerals, pyroxenes, and amphiboles and combinations thereof. The magnesium containing silicate may be sourced as: sands, sediment, rock, and combinations thereof.

Acid Wash

Acid washing noted above may be completed in a similar manner to that described above.

First Base Wash

The first base wash noted above may be completed in a similar manner to that described above. In one example, the first base wash may be completed in one step or in two steps. For example, a first base wash may comprise two base washes being to first remove the silica and second, to remove the iron. Silica removal may occur at a pH of approximately 2 or greater. Iron removal may occur at a pH of approximately 4 or greater.

Alternatively, the first base wash may occur in one step as one base wash to remove silica and iron together. In this example, the pH may be approximately 4 or greater.

Further Base Wash

A further base wash may be used to precipitate and recover magnesium hydroxide $Mg(OH)_2$. This further base wash may in one example be completed using NaOH or other metal hydroxide.

Recovery may be by filtration, the retentate comprising the magnesium hydroxide and the permeate from the further base wash being primarily a sodium salt solution.

In this further base wash, the pH may be increased to approximately 10 or greater.

The further base wash may be maintained for a period of time of at least approximately minutes, or 1 hour or up to approximately 2, 4, 6, 8, 10, 12, 14, 16, 18, 20, 22 or 24 hours (or possibly more) to ensure precipitation and development of the magnesium hydroxide.

The further base wash may be completed at a temperature from 20-90° C., or at approximately 20, or 25, or 30, or 35, or 40, or 45, or 50, or 55, or 60, or 65, or 70, or 75, or 80° C.

Electrolysis

Electrolysis may be completed in the above method to recover reagents. Electrolysis is not needed to produce magnesium hydroxide via this method.

The permeate from the further base wash may as noted above substantially comprise metal salt in solution. The permeate metal salt in solution may undergo electrolysis to produce an acid solution and a base solution, and optionally evolved gases. The acid solution produced may be recycled for acid washing in the above method; and the base solution produced may be recycled for base washing in the above method.

For example, if hydrochloric acid is used for acid washing and sodium hydroxide is used for base washing, the metal salt may be sodium salt in solution and in the electrolyser, the sodium salt solution may be consumed and chlorine $Cl_2$ (gas) recovered from the anode and hydrogen $H_2$ (gas) and sodium hydroxide (NaOH) recovered from the cathode. The $H_2$ and $Cl_2$ gas may be combined to form hydrochloric acid HCl that may be recycled for use in acid wash described above.

If sulphuric acid ($H_2SO_4$) (optionally including $NaHSO_4$) is used for the acid washing process, then hydrogen and NaOH may be generated at the cathode and oxygen may be generated at the anode during the electrolysis of $Na_2SO_4$ (produced from reacting the $MgSO_4$ with NaOH). In addition a sulphuric acid ($H_2SO_4$) solution may also be generated at the anode. This may also be recycled for use for further acid wash steps.

Other acid/base wash solutions may also be used in the above method and electrolysis used to separate resulting metal salt in solution to acid and base solutions.

The electrolyser may operate using similar operating characteristics to the electrolyser described above.

Washing

The recovered magnesium-hydroxide may be washed. Washing may be completed to remove contaminants and increase the purity of the magnesium hydroxide. The magnesium hydroxide may typically be washed with water using a counter current method to minimise water usage (i.e., recycled water used for first rinse and progressively cleaner water for final rinses).

Other Steps

Other steps described above around the base and acid solutions, slurry or pellet/granule formation and use of other materials may also be used in this method but are not repeated here for brevity. By way of example, inert materials may be added as described further below including: carbonates, silicates, oxides, and sulphates and combinations thereof. The inert materials may be selected from: clay minerals, quartz, zeolites, calcite, magnetite, magnesite and combinations thereof.

Method of Manufacture—Base Wash

In a fifth aspect there is provided a method of manufacturing a soda magcite composition comprising:
  selecting a magnesium containing silicate source;
  subjecting the selected magnesium containing silicate source to a base wash by adding a base solution to the magnesium containing silicate source to produce a magnesium hydroxide solution;
  mixing the recovered magnesium hydroxide with a solution containing metal hydroxide and water to produce the soda magcite composition.

The base solution may be a metal hydroxide. In one example the base solution may be sodium hydroxide.

Magnesium hydroxide may form in solution during base washing as noted above. In one example, the resulting magnesium hydroxide may be at least partly separated from the liquid in the solution. Separation may be via decanting.

Silica, or iron, or both silica and iron, may also be removed from the magnesium hydroxide solution. Removal of silica and iron may occur prior to mixing the magnesium hydroxide with metal hydroxide and water.

Sequestration

In a sixth aspect, there is provided a method of sequestration of carbon dioxide $CO_2$ by:
  selecting a soda magcite composition, the soda magcite composition comprising magnesium hydroxide, metal hydroxide, and water;
  exposing the soda magcite composition to $CO_2$; and
  wherein the soda magcite composition reacts with the $CO_2$ to form stable magnesium carbonates and hydrated magnesium carbonates and hence sequesters the $CO_2$.

Reaction

Magnesium hydroxide may naturally react with carbon dioxide $CO_2$ gas under both atmospheric (and near atmospheric) conditions and at elevated $CO_2$ levels, such as industrial point flue gas sources for example. This reaction forms stable magnesium carbonates and hydrated magnesium carbonates. This reaction, however, may not be a commercially optimal way to sequester significant volumes of $CO_2$. As noted elsewhere, mixing magnesium hydroxide with metal hydroxide and water accelerates the reaction process substantially, resulting in a commercially useful $CO_2$ sequestrant.

Direct Air Capture or Point Source Capture

The inventors have found that the soda magcite composition is sensitive and reactive with $CO_2$ so that it may be used for direct air capture or capture about a point source.

Exposure of the soda magcite composition in this environments directly captures $CO_2$ from the air hence the term direct air capture. This method of sequestration may be a useful passive means to sequester general $CO_2$ in the environment.

Point source capture may refer to exposing the soda magcite composition at or about a source of $CO_2$. Point sources may for example be from industrial sources, from residential sources or form commercial sources.

Soda Magcite Composition Form

The soda magcite composition may be used in a partially dried form such as in pellets or granules or as a slurry with compositions substantially as described above.

Reaction Rate

The rate of the reaction may be aided by an increase in $CO_2$ concentration and temperature. For example, the more $CO_2$ there is in the atmosphere or gas (e.g. exhaust gas) that the soda magcite composition is exposed to, the faster the reaction rate and $CO_2$ sequestration. This means that the soda magcite composition may be well suited to sequestration of high $CO_2$ producing sources.

The sequestration reaction rate may proceed more quickly when water is present. Water may be present as moisture. The moisture may be present at a moderate range of humidity. For example, at a relative humidity (RH) from 30-90%, or from 45-75%, or approximately 60%. Dry RH (low RH<40%) or very wet RH, >75% tends to be less effective in the inventor's experience for $CO_2$ sequestration rate although sequestration still occurs.

In the inventor's experience to date, approximately 1.3 tonnes of magnesium hydroxide in the described soda magcite composition may be required to sequester 1 tonne of $CO_2$ at 100% efficiency. The actual operating efficiency will be below 100%, hence, these figures are presented by way of example only and should not be seen as limiting.

Capture Apparatus

The soda magcite composition described, may be incorporated into a method or apparatus or both method and apparatus, to increase mass transfer and mixing. The methods/apparatus may for example comprise: a fluidized bed, wet scrubber, dry scrubber, ambient exposure (spread on a field for example).

In point source applications, a slurry of soda magcite composition may be used in a wet scrubber configuration as one example where the slurry may be distributed as a fine mist in a column of hot gas about the point source. Alternatively, a dry scrubbed arrangement may use solid soda magcite composition such as a pellet or granule. This may be for example, in a fluidized bed type scrubber.

For direct air capture applications, solid soda magcite composition may be used where air may be passed over the magnesium material.

Advantages

As noted above, the inventors have identified a soda magcite composition acts in a synergistic manner to sequester $CO_2$. Magnesium hydroxide materials do sequester $CO_2$. The inventors found that by mixing metal hydroxide and water with magnesium hydroxide, the rate of $CO_2$ sequestration by the magnesium hydroxide may rapidly accelerate, to the point of being a rapid and useful method of reducing $CO_2$ emissions.

A further advantage identified is that the soda magcite composition may be made without the method itself producing $CO_2$ and hence negating any benefits of subsequent sequestration.

The examples described above may also be said broadly to consist in the parts, elements and features referred to or indicated in the specification of the application, individually or collectively, and any or all combinations of any two or more said parts, elements or features.

Further, where specific integers are mentioned herein which have known equivalents in the art to which the examples relate, such known equivalents are deemed to be incorporated herein as if individually set forth.

WORKING EXAMPLES

The above described soda magcite composition, methods of manufacture and methods of $CO_2$ sequestration are now described by reference to specific examples.

Example 1

An example soda magcite composition in the form of a pellet or granule produced by the inventors is demonstrated in Table 1 below:

TABLE 1

Example Pellet/Granule Soda Magcite Composition

| Compound | Details | Amount (all by weight) |
| --- | --- | --- |
| Magnesium hydroxide | Obtained from magnesium silicate bearing minerals comprising: olivine, serpentine group minerals, pyroxenes, and amphiboles. | 5-95% |
| Metal hydroxide | E.g. NaOH, LiOH or KOH, Ca(OH)$_2$ | 1-95% |
| Water | | 5-95% |
| Silica containing materials | Kaolin, smectite, bentonite or vermiculite | <50% |
| Inert materials | E.g. magnesite, calcite, dolomite, siderite, clay minerals, and zeolites | <20% |
| Metal salts | E.g. LiCl, NaCl, KCl, MgCl$_2$, Na$_2$SO$_4$, MgSO$_4$ | <10% |

The pellets or granules produced may be approximately 1 µm to 10 mm in diameter.

Example 2

An example soda magcite composition in the form of a slurry produced by the inventors is demonstrated in Table 2 below:

TABLE 2

Example Slurry Soda Magcite Composition

| Compound | Details | Amount (all by weight) |
| --- | --- | --- |
| Magnesium hydroxide | Obtained from magnesium silicate bearing minerals comprising: olivine, serpentine group minerals, pyroxenes, and amphiboles. | 1-99% |
| Metal hydroxide | E.g. NaOH, LiOH or KOH, Ca(OH)$_2$ | 0.1-99% |
| Water | | 5-99% |
| Silica containing materials | E.g. kaolin, smectite, bentonite or vermiculite | <50% |
| Inert materials | E.g. magnesite, calcite, dolomite, siderite, clay minerals, and zeolites | <20% |
| Metal salts | E.g. LiCl, NaCl, KCl, MgCl$_2$, Na$_2$SO4, MgSO$_4$ | <10% |

Example 3

In this example a basic method of producing a soda magcite composition is described by the steps of:
- Selecting a magnesium hydroxide containing material. This material may be produced via a processing method described in further examples below or supplied in purified form prior to commencement;
- Optionally, grind the magnesium hydroxide containing material to an average particle size less than 1 mm;
- Selecting a metal hydroxide e.g. NaOH; and
- Mixing water with the magnesium hydroxide containing material and the metal hydroxide together to form the soda magcite composition;
- Optionally adding silica containing materials, inert materials, and metal salts, described above;
- Optionally, remove water via drying;
- Optionally, forming the soda magcite composition produced into a pellet or granule or a slurry.

Example 4

In this example a method of producing magnesium hydroxide is described along with subsequent manufacture of the above final soda magcite composition with reference to FIG. 1. Steps completed are as follows:
- Selecting olivine as the magnesium containing silicate source as olivine sand or processed olivine-rich rock. In this example, the olivine is sourced with an average particle size of <1 mm;
- Magnetic iron is removed from the olivine sand (approximately 13% of total mass of the olivine sand);
- Olivine is then ground in a puck mill to produce average particle size of 30 μm;
- An acid wash is completed at a rate of 50 g of ground olivine added to 500 ml of 2 M HCl acid. The acid wash is completed at 60° C. for approximately 3 hours;
- A base wash is then completed by adding sodium hydroxide to bring pH up to approximately 2.5 to precipitate silica;
- The solution produced is filtered and retentate (filter cake) washed;
- Additional base solution (sodium hydroxide) is added to the permeate to bring the pH up to 6 to precipitate any remaining iron;
- The solution is filtered and retentate (filter cake) washed;
- The permeate produced is primarily ~1 M magnesium chloride ($MgCl_2$) solution with some sodium chloride (NaCl) present;
- The $MgCl_2$ solution is placed in an electrolyser and electrolysis completed. Chlorine ($Cl_2$) gas is recovered from the anode and hydrogen ($H_2$) gas is recovered from the cathode. Optionally, the gases evolved may be combined to form HCl acid for acid washing of further magnesium containing silicate source;
- The magnesium hydroxide $Mg(OH)_2$ recovered from the cathode contains approximately 50% moisture;
- Soda magcite composition is then produced by adding 2 g of sodium hydroxide NaOH powder to 10 g of recovered magnesium hydroxide $Mg(OH)_2$ to create high moisture content pellets.

Note that hydrochloric acid may be replaced with sulphuric acid or other acids in the above example.

Example 5

Figure 2:
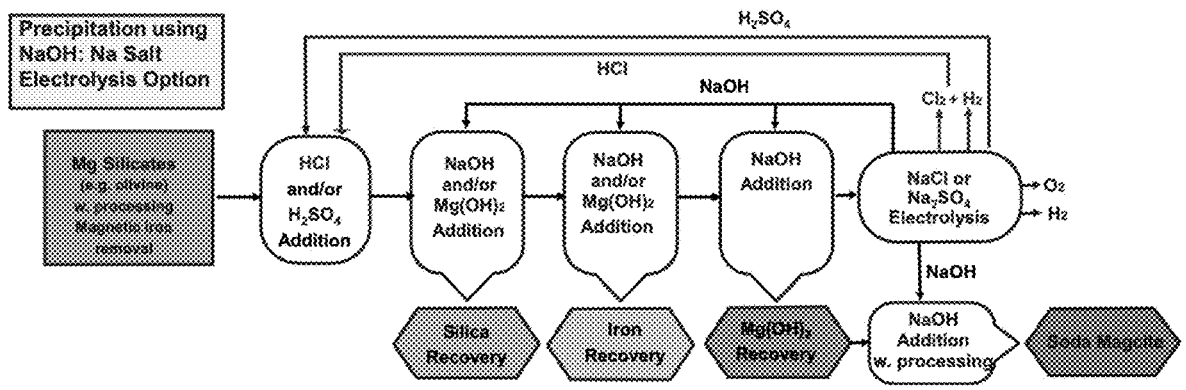
FIG. 2 illustrates a flow diagram of an alternative method of producing magnesium hydroxide along with subsequent manufacture of a soda magcite composition.

In this example a method of producing magnesium hydroxide is described along with subsequent manufacture of the above final soda magcite composition with reference to FIG. 2. Steps completed are as follows:
- Selecting olivine as the magnesium containing silicate source as olivine sand or processed olivine-rich rock. In this example, the olivine is sourced with an average particle size of <1 mm;
- Magnetic iron is removed from the olivine sand (approximately 13% of total mass of the olivine sand);
- Olivine is then ground in a puck mill to produce average particle size of 30 μm;
- An acid wash is completed at a rate of 50 g of ground olivine added to 500 ml of 2 M HCl acid. The acid wash is completed at 60° C. for approximately 3 hours;
- A first base wash is then completed by adding sodium hydroxide to bring pH up to approximately 2.5 to precipitate silica;
- The solution produced is filtered and retentate (filter cake) washed;
- Additional base solution (sodium hydroxide) is added to the permeate to bring the pH up to 6 to precipitate any remaining iron;
- The solution is filtered and retentate (filter cake) washed;
- A further base wash is the completed by adding base solution NaOH to the permeate to bring the solution pH up to 11 to precipitate magnesium hydroxide. The magnesium hydroxide produced has a moisture content of approximately 50%;
- The solution is then filtered and retentate (filter cake) may be washed or left with residual NaOH. The permeate produced is primarily approximately 2 M NaCl solution;
- Optionally, the permeate solution may be placed in an electrolyser and electrolysis completed. Chlorine ($Cl_2$) gas is recovered from the anode and hydrogen ($H_2$) gas is recovered from the cathode. Optionally the gases evolved may be combined to form HCl acid for acid washing of further magnesium containing silicate source;
- The magnesium hydroxide $Mg(OH)_2$ recovered from the cathode contains approximately 50% moisture;
- Soda magcite composition is then produced by drying (approximately 50% reduction in mass) of recovered $Mg(OH)_2$ to create 25% moisture content pellets. NaOH is also present due to additional base solution used in the magnesium-precipitation stage;
- Additional NaOH may be added if necessary to the recovered $Mg(OH)_2$;
- Silica or clay may also be added.

Note that hydrochloric acid may be replaced with sulphuric acid or other acids in the above example.

Example 6

Figure 3:
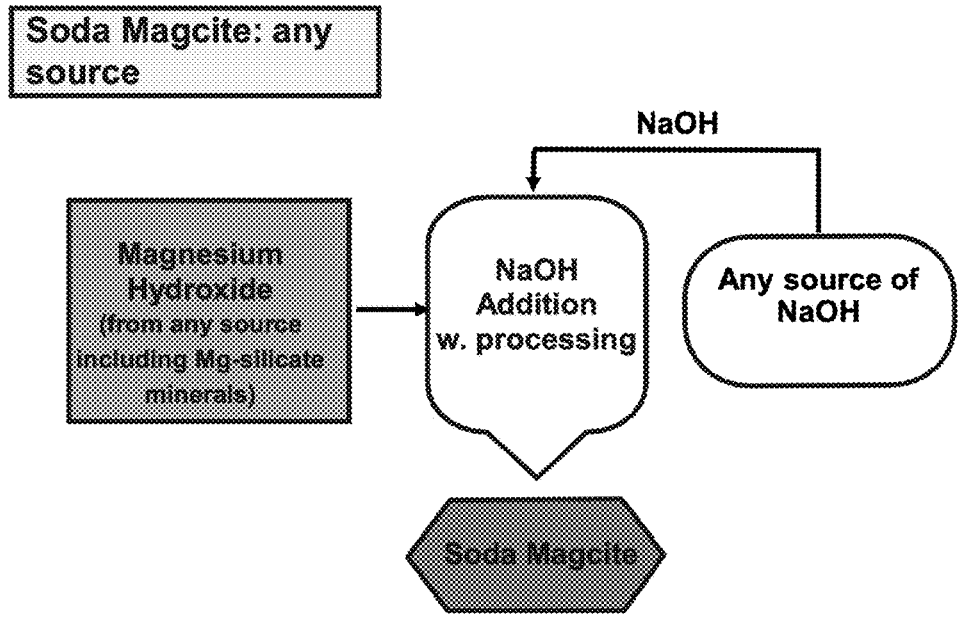
FIG. 3 illustrates a flow diagram of a further alternative method of producing magnesium hydroxide along with subsequent manufacture of a soda magcite composition.

Referring to FIG. 3, an example of a method of producing soda magcite composition is described below by direct NaOH addition (note: this differs from base washing described in other examples where washing causes a pH increase for the purpose of product separation):
- Magnesium hydroxide is obtained from any source (i.e. commercially available).
- If applicable, the magnesium hydroxide can be ground to produce an average particle size less than 1 mm.
- A solution containing a mixture of NaOH (or other metal hydroxide) with water can be added to the Mg-hydroxide. The metal hydroxide concentration of the solution is adjusted to produce a final material with a composition as described in table 1 (pelletized) or table 2 (slurry).

Alternatively, solid NaOH is combined with Mg-hydroxide and water added to achieved the composition outlined in Table 1 and Table 2.

Clays, silica or other material may be added to the mixture.

The mixture maybe processed into pellets. The pellets will typically be approximately 1 mm in diameter (but may be 1 um to 10 mm).

Alternatively, the mixture can be maintained in slurry.

Example 7

Referring to FIGS. 4-8, methods of $CO_2$ sequestration are described using soda magcite composition.

Direct Air Capture

Figure 4:
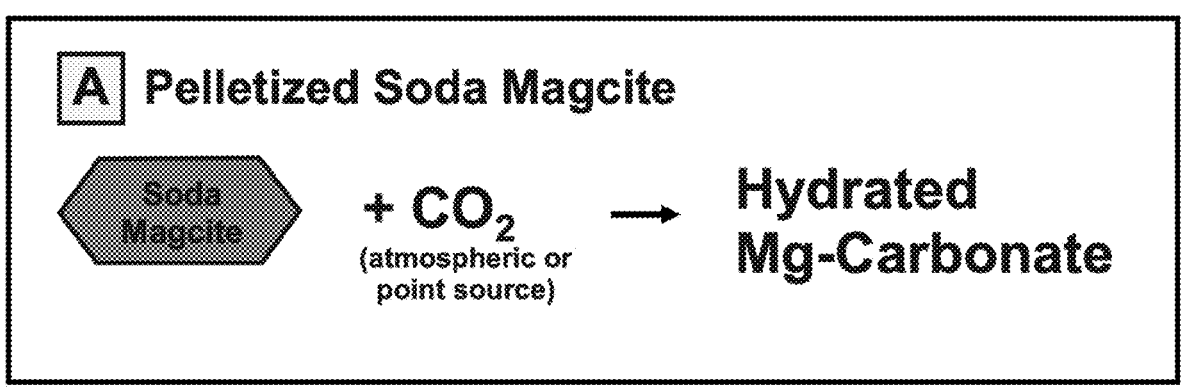
FIG. 4 illustrates a flow diagram where solid soda magcite composition is used to sequester $CO_2$ where air is passed over the soda magcite composition material and where the soda magcite composition is in a pelletised form and reacts with carbon dioxide gas in the air to produce a hydrated magnesium carbonate end product.

Typically, soda magcite composition may be used where air is passed over the soda magcite composition. FIG. 4 illustrates this reaction where the soda magcite composition is in a pelletised form and naturally reacts with carbon dioxide gas (atmospheric or point source) to produce a hydrated magnesium carbonate end product.

Figure 5:
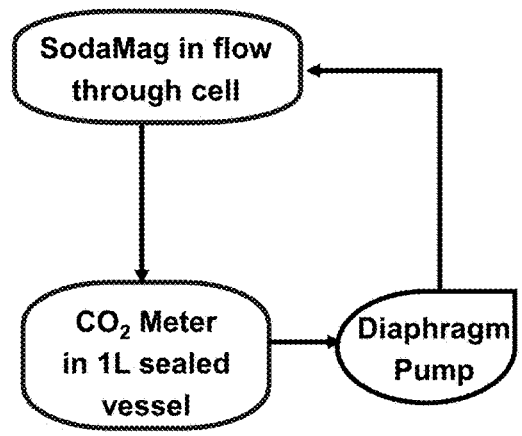
FIG. 5 illustrates an apparatus for direct air capture according to the flow diagram of FIG. 4.

The above reaction may occur using an apparatus as shown in FIG. 5. In an experiment completed by the inventors using the apparatus of FIG. 5 as a closed system, a first measurement was a control where no soda magcite composition was added to the flow through the cell shown. Steady state atmospheric $CO_2$ readings of approximately 400 ppm were recorded. 5 g of pelletised soda magcite composition was placed in the flow through cell and readings then taken over time of the $CO_2$ levels. The $CO_2$ readings decreased from a starting value of approximately 400 ppm to less than 200 ppm over 24 hours illustrating the $CO_2$ absorbing properties of the soda magcite composition.

Point Source Carbon Capture

Figure 6:
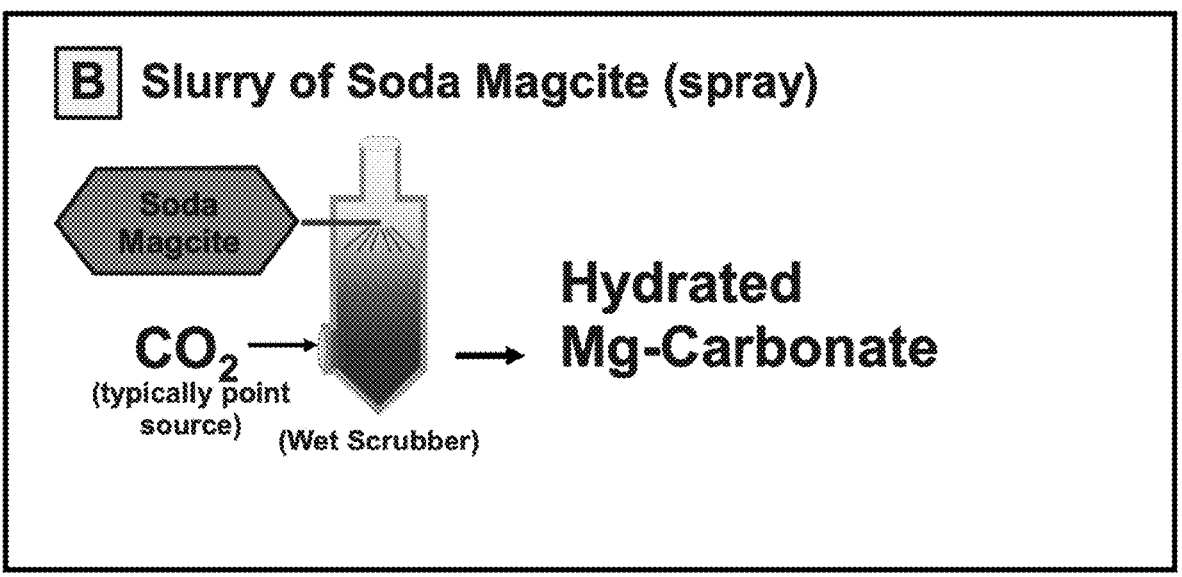
FIG. 6 illustrates a flow diagram of an alternative sequestration method using a slurry of soda magcite composition in a wet scrubber configuration where the slurry is distributed as a fine mist in a column of hot gas.

As an alternative, a slurry of soda magcite composition may be used in a wet scrubber configuration where the slurry is distributed as a fine mist in a column of hot gas as illustrated in FIG. 6.

In a further alternative method, a dry scrubbed arrangement may use a pelletised soda magcite composition (for instance in a fluidised bed type scrubber). To demonstrate the carbon absorption reaction for this alternative method, an experiment was completed by the inventors as follows:

~5 grams of soda magcite composition was placed in a beaker containing deionised water;

Concentrated $CO_2$ (~99%) was passed through the cell for a period of approximately 1 hour.

Following the addition of $CO_2$, the thermogravimetric analysis results and acid test verified the presences of a highly carbonated material demonstrating carbon absorption.

Aqueous Carbon Capture

Figure 7:
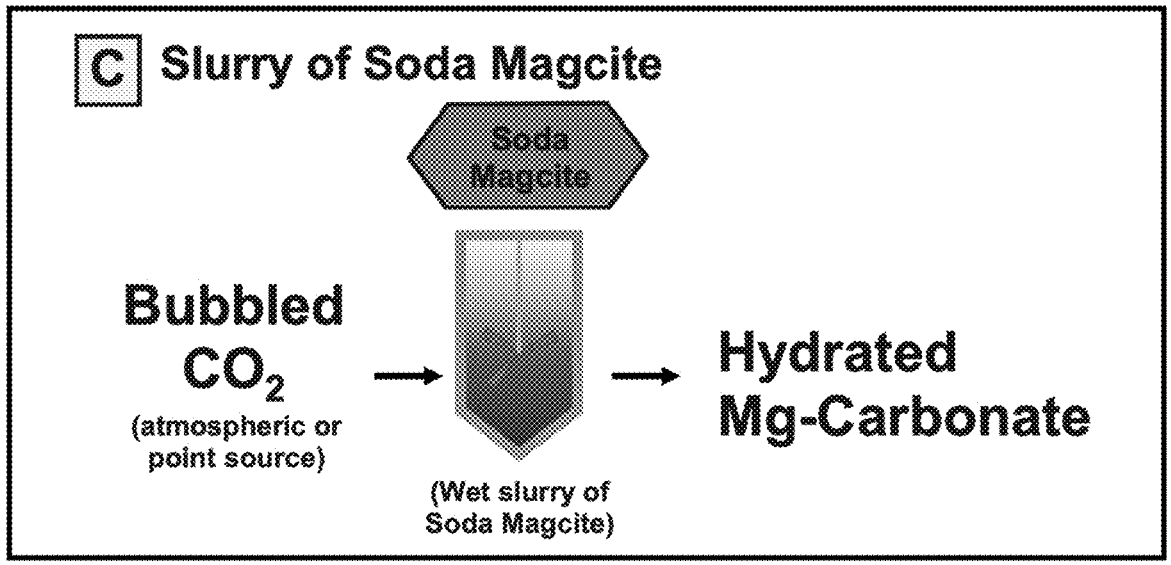
FIG. 7 illustrates a further flow diagram of a method of sequestration via bubbling of $CO_2$ through a slurry containing soda magcite composition.

A further method for sequestration may be via bubbling of $CO_2$ through a slurry containing soda magcite composition as illustrated in FIG. 7.

To further illustrate this method of sequestration, an experiment was completed as follows:

~21 grams of soda magcite composition was placed in a beaker containing deionised water;

Concentrated $CO_2$ (~99%) was bubbled through the beaker for a period of ~15 minutes.

Figure 8:
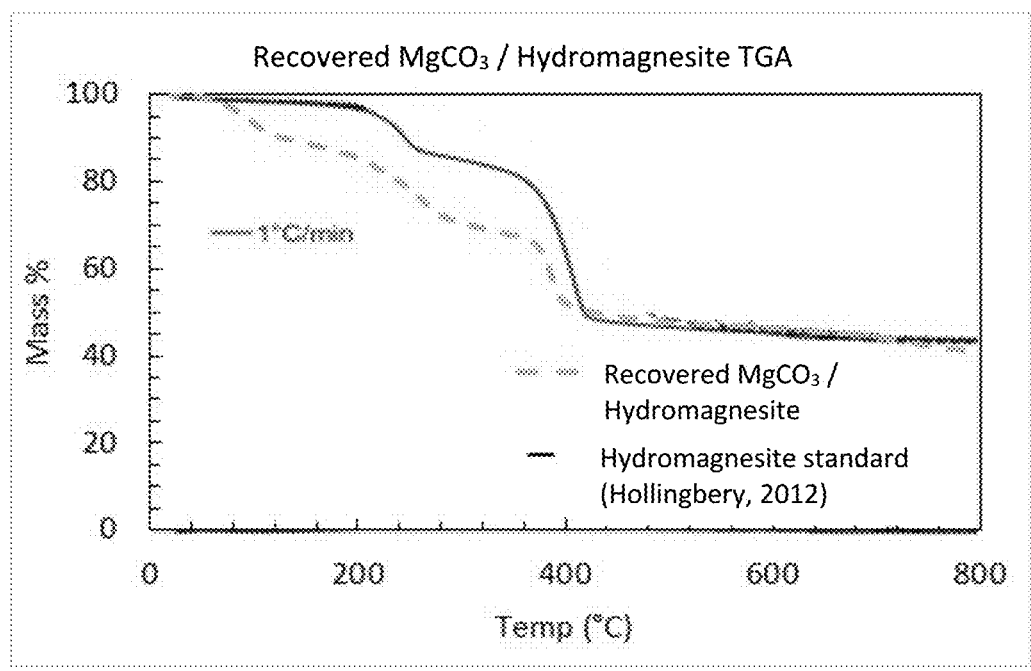
FIG. 8 illustrates a graph showing the results of a $CO_2$ sequestration trial.

The thermogravimetric results after exposure of the soda magcite composition to $CO_2$ bubbling shown in FIG. 8, illustrates the material was a hydrated magnesium carbonate similar to hydromagnesite.

Aspects of the soda magcite composition, methods of manufacture and methods of $CO_2$ sequestration have been described by way of example only and it should be appreciated that modifications and additions may be made thereto without departing from the scope of the claims herein.

What is claimed is:

1. A magnesium based hydrate composition, comprising:
   60-90% by weight of magnesium hydroxide containing material;
   1 to 10% by weight of NaOH; and
   greater than 5% of water;
   wherein said magnesium hydroxide containing material and said NaOH and said water are all configured to be mixed together to form the magnesium based hydrate composition, such that via said NaOH of said magnesium based hydrate composition, said magnesium based hydrate composition is configured to catalyze sequestration of carbon to said magnesium hydroxide containing material.

2. A method of manufacturing a magnesium based hydrate composition, comprising:
   selecting a magnesium containing silicate source;
   subjecting the magnesium containing silicate source that is selected to acid wash, to produce an acid digested solution;
   subjecting the acid digested solution to a base wash by adding a base solution to the acid digested solution to produce a magnesium salt solution and, during this step, removing silica, iron or other metals and minerals from the magnesium salt solution;
   subjecting the magnesium salt solution to electrolysis to recover magnesium hydroxide;
   mixing the magnesium hydroxide that is recovered with a solution containing NaOH and water to produce the magnesium based hydrate composition;
   wherein said magnesium based hydrate composition comprises
   60-90% by weight of magnesium hydroxide containing material;
   1 to 10% by weight of said NaOH; and
   greater than 5% of said water,
      such that via said NaOH of said magnesium based hydrate composition, said magnesium based hydrate composition is configured to catalyze sequestration of carbon to said magnesium hydroxide containing material.

3. A method of manufacturing a magnesium based hydrate composition comprising:
   selecting a magnesium containing silicate source;
   subjecting the magnesium containing silicate source that is selected to a base wash by adding a base solution to the magnesium containing silicate source to produce a magnesium hydroxide solution;
   mixing magnesium hydroxide that is recovered with a solution containing NaOH and water to produce the magnesium based hydrate composition;
   wherein said magnesium based hydrate composition comprises
   60-90% by weight of magnesium hydroxide containing material;
   1 to 10% by weight of said NaOH; and
   greater than 5% of said water,
      such that via said NaOH of said magnesium based hydrate composition, said magnesium based hydrate composition is configured to catalyze sequestration of carbon to said magnesium hydroxide containing material.

4. The method as claimed in claim 3 wherein the magnesium containing silicate source is selected from a group consisting of: olivine, serpentine group minerals, pyroxenes, and amphiboles.

5. The magnesium based hydrate composition as claimed in claim 1 wherein said magnesium based hydrate composition further comprises
70-80% by weight of said magnesium hydroxide containing material;
1 to 10% by weight of said NaOH; and
greater than 5% of said water.

6. The magnesium based hydrate composition as claimed in claim 1 wherein said magnesium based hydrate composition is configured as a slurry with a solids content of 1-50% by weight.

7. The magnesium based hydrate composition as claimed in claim 6 wherein the solids content is 5-15% by weight.

8. The method as claimed in claim 2 wherein said magnesium based hydrate composition further comprises
70-80% by weight of said magnesium hydroxide containing material;
1 to 10% by weight of said NaOH; and
greater than 5% of said water.

9. The method as claimed in claim 2 wherein said magnesium based hydrate composition is configured as a slurry with a solids content of 1-50% by weight.

10. The method as claimed in claim 9 wherein the solids content is 5-15% by weight.

11. The method as claimed in claim 3 wherein said magnesium based hydrate composition further comprises
70-80% by weight of said magnesium hydroxide containing material;
1 to 10% by weight of said NaOH; and
greater than 5% of said water.

12. The method as claimed in claim 3 wherein said magnesium based hydrate composition is configured as a slurry with a solids content of 1-50% by weight.

13. The method as claimed in claim 12 wherein the solids content is 5-15% by weight.

14. A method of manufacturing a magnesium based hydrate composition comprising:
selecting a magnesium containing silicate source;
subjecting the magnesium containing silicate source that is selected to acid wash, to produce an acid digested solution;
subjecting the acid digested solution to a base wash by adding a base solution to the acid digested solution to produce a magnesium salt solution and, during this step, removing silica, iron or other metals and minerals from the magnesium salt solution;
completing a further base wash to separate magnesium hydroxide in solution and filtering the magnesium hydroxide in solution that is separated and recovering a magnesium hydroxide retentate and a permeate, the permeate comprising metal salt in solution;
mixing the magnesium hydroxide that is recovered with a solution containing NaOH and water to produce the magnesium based hydrate composition, said magnesium based hydrate composition comprising
60-90% by weight of magnesium hydroxide containing material;
1 to 10% by weight of said NaOH; and
greater than 5% of said water,
such that via said NaOH of said magnesium based hydrate composition, said magnesium based hydrate composition is configured to catalyze sequestration of carbon to said magnesium hydroxide containing material.

15. The method as claimed in claim 14 wherein the permeate comprising metal salt in solution undergoes electrolysis to produce an acid solution and a base solution, and evolved gases.

16. The method as claimed in claim 14 wherein said magnesium based hydrate composition further comprises
70-80% by weight of magnesium hydroxide containing material; and,
greater than 5% of water.

17. The method as claimed in claim 14 wherein said magnesium based hydrate composition is configured as a slurry with a solids content of 1-50% by weight.

18. The method as claimed in claim 17 wherein the solids content is 5-15% by weight.

* * * * *